United States Patent [19]

Greaves et al.

[11] Patent Number: 5,755,312
[45] Date of Patent: May 26, 1998

[54] TORSION DAMPING DEVICE FOR A LOCKING CLUTCH, ESPECIALLY FOR A MOTOR VEHICLE

[75] Inventors: Brian Greaves, Dearborn, Mich.; Michel Ginaldi, Paris, France

[73] Assignee: Valeo, Paris, France

[21] Appl. No.: 649,690

[22] PCT Filed: Sep. 28, 1995

[86] PCT No.: PCT/FR95/01248

§ 371 Date: Aug. 22, 1996

§ 102(e) Date: Aug. 22, 1996

[87] PCT Pub. No.: WO96/10140

PCT Pub. Date: Apr. 4, 1996

[30] Foreign Application Priority Data

Sep. 28, 1994 [FR] France ................... 94 11702

[51] Int. Cl.[6] ................... F16H 45/02
[52] U.S. Cl. ................... 192/3.29
[58] Field of Search ................... 192/3.29, 3.3, 192/3.33, 3.28; 464/66

[56] References Cited

U.S. PATENT DOCUMENTS 4,445,599  5/1984  Bopp ................... 192/3.29
4,875,562  10/1989 Fujimoto .
5,655,635  8/1997  Yuergens et al. ................... 192/3.29

FOREIGN PATENT DOCUMENTS 0533426  3/1993  European Pat. Off. .
4242255  6/1994  Germany .
2255395  11/1992 United Kingdom .
94-07058  3/1994  WIPO .

Primary Examiner—Rodney H. Bonck
Attorney, Agent, or Firm—Longacre & White

[57] ABSTRACT

A torsion device comprising an input part (20) comprising a piston (24) equipped with a guide washer (28) and an output part comprising an annular disc (36), and of the type comprising a series of lugs (44) folded radially inwards and which cooperate with the section (42) of a peripheral edge (40) of the disc (36). The edge (40) comprises a series of slots (48) distributed angularly like the lugs (44) of the first portion and dimensioned so as to allow the axial introduction of the lugs (44) into the slots (48) then the axial retention of the second portion (22) inside the first portion (20) by the relative rotation of these two portions by a fraction of a turn, in the manner of a bayonet-type mounting.

7 Claims, 2 Drawing Sheets

TORSION DAMPING DEVICE FOR A LOCKING CLUTCH, ESPECIALLY FOR A MOTOR VEHICLE

BACKGROUND OF THE INVENTION

1. Field of the Invention

The present invention relates to a torsion damping device for a locking clutch capable of acting between the driving element and the driven element of a hydrokinetic coupling device, especially for a motor vehicle.

2. Description of the Prior Art

A locking clutch, usually known as a "LOCK-UP" clutch, for a hydrokinetic coupling device acting between a driving element and a driven element comprises a torsion damping device, a piston mounted movably axially in relation to the driven element, at least one friction lining associated with the piston and capable of being clamped between the piston and a counter-piston.

The torsion damping device comprises an input part, called the first portion, an output part, called the second portion, and springs placed circumferentially between the input and output parts to couple them rotationally.

Such a clutch is for example described and represented in the documents U.S. Pat. No. 4,875,562 and in International Patent Application WO/FR93/00936 (WO94/07058).

In the document U.S. Pat. No. 4,875,562, the piston is adapted to form the input part of the torsion damping device and it bears a friction lining capable of coming into contact with the transversal wall of the housing of the hydrokinetic device, this wall forming the counter-piston.

The housing belongs to a tight case filled with oil and it is capable of being connected rotationally to a driving shaft.

The output part of the damping device is integral with the turbine wheel of the hydrokinetic device.

The turbine wheel is integral with a hub capable of being rotationally connected to a driven shaft.

Thus, the case forms a driving element whereas the hub of the turbine wheel forms a driven element and the locking clutch is capable of acting between the case and the turbine wheel to perform a coupling therebetween.

In the document U.S. Pat. No. 4,875,562, the torsion damping device comprises the piston externally retaining the springs (or resilient members), and also a guide washer borne by being fixed, in this case by riveting, by the piston and which internally retains the springs thanks to retention lugs.

The piston and the guide washer have bearing lugs to act on the circumferential ends of the springs. On its outer periphery the piston also has a cylindrical annular skirt.

The input portion is thus formed by two parts, whereas the output portion comprises an annular disc which is integral with the turbine wheel.

The output disc has bearing lugs, which penetrate between the circumferential ends of two consecutive springs to act thereon.

These lugs each penetrate radially between two bearing lugs associated with the piston and the guide washer respectively.

In the document WO94/07058, the torsion damping device comprises two parts, with the guide washer being fixed on the piston. This guide washer and the disc have retention parts for retaining the springs externally and internally respectively.

Furthermore, the disc and the guide washer have bearing lugs for acting on the circumferential ends of the springs.

As described and represented in this document WO94/07058, means are specified to initially axially retain the disc inside the first portion and to allow a relative angular clearance between the two portions of the damping device, which comprise a series of snap-on lugs of the guide washer of the first portion which are folded radially inwardly in the direction of the axis of the damping device and which cooperate with the section of a cylindrical annular peripheral edge of the disc of the second portion.

Thanks to these retention means, after mounting the springs, by snapping the disc into the snap-on lugs, it is possible to create a sub-assembly which is unitary, captive, easy to handle and transportable, compiling the piston and the torsion damping device, this sub-assembly being then able to be positioned on the turbine hub.

Although the assembly of the disc with the washer by snapping between the folded parts is facilitated by the fact that the washer is less thick than the disc, it is not entirely satisfactory insofar as it complicates the production of the washer and insofar as this type of assembly by interlocking, which calls on a momentary deformation of the snap-on and retention lugs, results in a not negligible force being developed during assembly by interlocking.

SUMMARY OF THE INVENTION

The object of the present invention is to propose a new design of a torsion damping device comprising, in a simple and economical manner, improved means for the axial retention of the disc of the second portion of the damping device in relation to the first portion of the latter.

To this end, the invention proposes a torsion damping device of the type mentioned above, characterised in that the annular peripheral edge of the disc comprises a series of slots distributed angularly like the lugs of the first portion and dimensioned so as to allow the axial introduction of the lugs into the slots then the axial retention of the second portion inside the first portion by relative rotation of these two portions by a fraction of a turn, in the manner of a assembly of the bayonet type and in that the said lugs are formed in a cylindrical annular skirt which the piston has on its outer periphery.

Thanks to the invention, the guide washer is simplified and the assembly force is reduced since the lugs only have to be deformed momentarily. Moreover the guide washer - piston assembly is very rigid.

According to other advantages of the invention:

- the lugs and the slots are arranged in series of pairs of adjacent lugs and slots;
- the piston externally retains the springs and thus belongs to the torsion damping device. Thanks thereto bosses can be produced in advance in the disc for bearing the springs and the guide washer is further simplified.

The disc advantageously comprises openings to finally allow the attachment by riveting of the guide washer to the piston and the formation of a sub-assembly.

Other characteristics and advantages of the invention will become apparent from reading the following detailed description, for the understanding of which reference will be made to the attached drawings in which:

DETAILED DESCRIPTION OF THE PREFERRED EMBODIMENT

Figure 2:
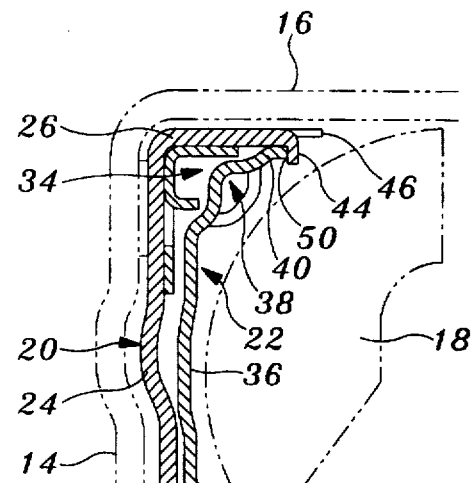
FIG. 2 is a partial sectional view along line 2—2 of FIG. 1.
Figure 3:
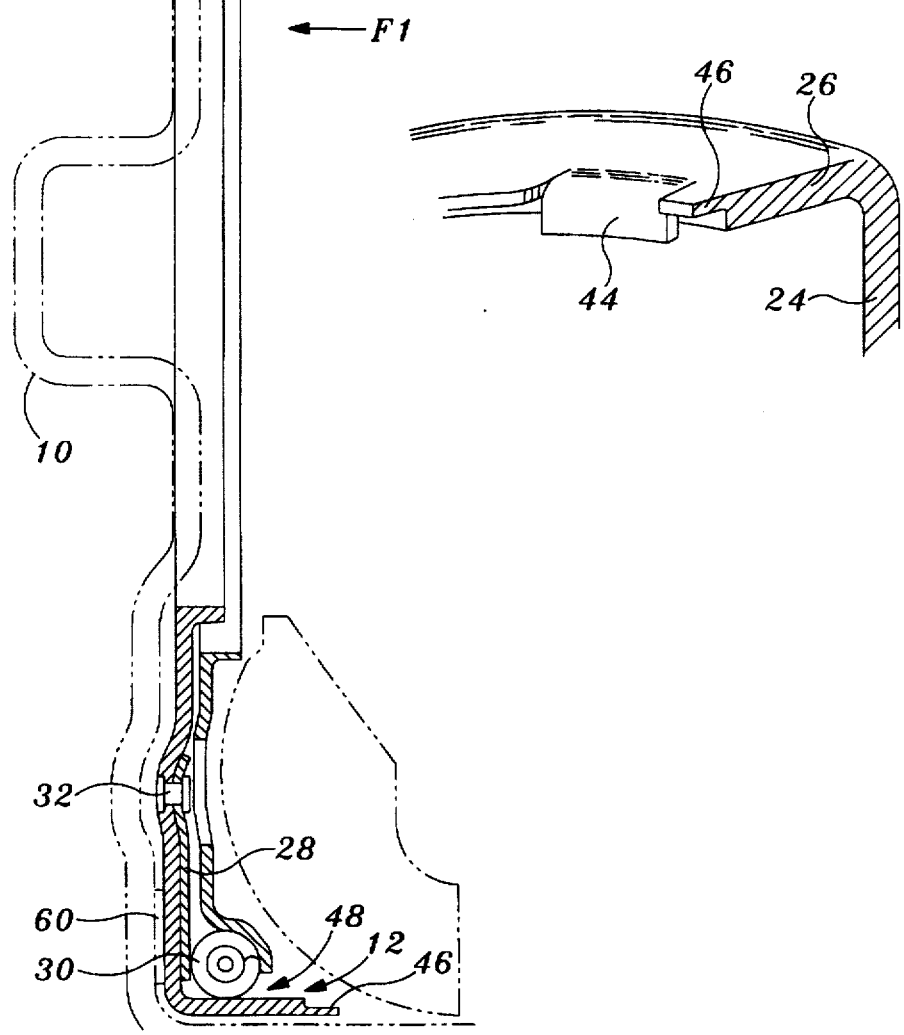
FIG. 3 is a perspective view of a detail on a larger scale illustrating the design of the retention lugs of the disc.

The housing 10 of a torque converter (not represented) equipped with a torsion damping device 12 produced in accordance with the teachings of the invention is represented in silhouette on FIG. 2.

The housing 10, which has an annular shape, comprises an end wall 14, generally transversally orientated, in the form of a disc and a cylindrical annular skirt 16, generally axially orientated, extending to the outer periphery of the wall 14.

The wall 14 is planned to be connected to a primary shaft or driving shaft, whereas the skirt 16 is planned to be fixed to the outer edge of a impeller wheel (not represented) of the converter, as described in document WO94/07058, to form a tight case filled with oil.

A turbine wheel 18 of the converter, which is planned to be fixed to an output shaft or driven shaft, has also been represented in silhouette on FIG. 2. The converter also comprises a reaction wheel (not visible).

The torsion damping device 12 is disposed between the wall 14 of the housing 10 and the turbine wheel 18 and comprises a first portion 20, forming an input part, and a second portion 22, forming an output part, which are coaxial and capable of rotating in relation to one another in opposition to circumferentially acting resilient means, here pre-curved coil springs 30, and of moving axially in relation to one another. The springs 30 are disposed on the outer periphery of the housing 10 and of the turbine wheel 18.

Reference can be made to the contents of the two previously mentioned documents to learn in detail of the arrangement of the various components of the torsion damping device and their connections with the components of the torque converter.

The first portion 20 is essentially formed of a piston 24 in the form of an annular disc which extends adjacently to the wall 14 of the housing 10 and which is extended at its outer periphery by an axially oriented cylindrical annular skirt 26.

On its outer face, faced towards the wall 14, the piston 24 bears by fixing a friction lining 60 intended to be clamped against the wall 14.

Of course as a variant the lining 60 may be integral with the wall 14.

On its inner face, faced towards the turbine wheel 18, the piston 24 is equipped with a guide washer 28 of the springs 30, which is fixed thereto by a series of circumferentially distributed rivets 32.

According to a known design, the washer 28 comprises fittings 34 or parts 34 for the support of the circumferential ends of the springs 30.

The second portion 22 of the torsion damping device 12 is essentially formed by a plate in the shape of an annular disc 36, which also comprises parts 38 serving as a support for the circumferential ends of the springs 30.

The disc 36 is extended at its outer periphery towards the wheel 18, in the opposite direction to the piston 24, by an annular cylindrical annular edge 40, which, like the skirt 26 of the piston 24, is axially orientated and which is slidingly received inside the latter.

The axially orientated cylindrical annular edge 40 ends in an annular end section 42. The piston 24 is thicker than the guide washer 28 and than the disc 36.

More precisely, the guide washer 28, here metallic, has on its outer periphery parts 34 with a U-shaped section inserted between two consecutive springs 30. The circumferential ends of the springs 30 bear, possibly indirectly by means of bearing plates, on the section of the parts 34 axially directed towards the turbine wheel 18 and the disc 36.

Thus two axially oriented bearing lugs are defined by part 34, with the longer one serving for the external bearing of the springs 30 and the other one, which is shorter axially, for the internal bearing of the springs 30. This short lug is obtained by blanking and folding from the guide washer 28. The long lug is slidingly received inside the skirt 26.

The disc 36, here metallic, has the above-mentioned parts 38 penetrating radially between the lugs of the parts 34. More precisely the bearing parts 38 of the ends of the springs 30 are formed by means of bearing bosses in a sinuous shape extending to the outer periphery of the disc 36 formed to retain the springs 30 internally.

This outer periphery having bearing bosses 38 here is in a demi-shell or demi-toric shape to retain internally the springs 30. It is extended at its outer periphery by the annular edge 40 protruding axially towards the turbine wheel 18.

The piston 24, here metallic, thanks to its skirt 26 allows the springs 30 to be externally retained. This skirt 26 surrounds the disc 36, which is radially extended towards the interior by a generally axially orientated flange, provided on its inner periphery with a hub for its rotational connection with the hub of the turbine wheel as described in document WO94/07058.

In accordance with the invention, the axial retention of the second portion 22 of the torsion damping device 12 inside the first portion 20 is ensured by means of a series of pairs of retention lugs 44 formed integrally by blanking and bending in the thinner portion of the free end 46 of the cylindrical annular skirt 26 of the piston 24.

Figure 1:
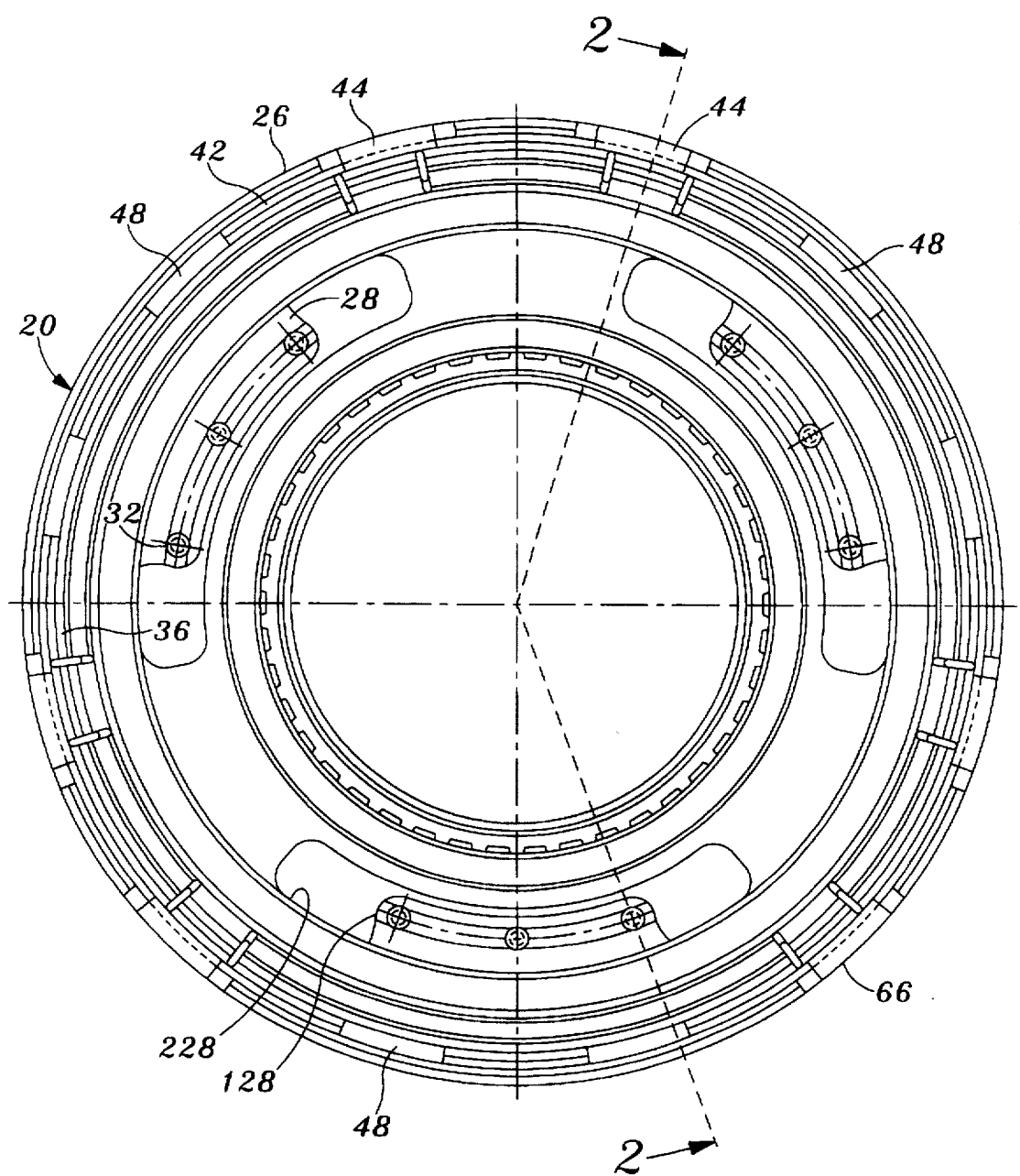
FIG. 1 is a right-hand lateral view, along arrow F1 of FIG. 2, of the main components of a damping device produced in accordance with the teachings of the invention.

In the embodiment illustrated on the figures, the retention lugs 44, which beforehand are folded radially towards the inside, number six arranged in three pairs of adjacent lugs and are angularly distributed in a regular manner in pairs as can be seen on FIG. 1.

In order to allow the axial introduction of the disc 22 to the inside of the first portion 20, the annular peripheral edge 40 of the latter comprises three series of introduction slots arranged in pairs 48.

The introduction slots 48 are distributed regularly in the same manner as the retention lugs 46 and circumferentially they have dimensions so as to allow the passage of the lugs 44 into the slots 48 to bring the annular section 42 of the peripheral edge 40 of the disc 36 set back from the radial plane delimited by the inner face 50 of the retention lugs 44, then to allow, according to the invention, a relative rotation of the two portions 20 and 22 to bring, as illustrated in FIGS. 1 and 2, the radially oriented retention lugs 44 opposite the parts of the section 42 not having slots 48. The slots 48 are wider circumferentially than the lugs 44 for ease of assembly. They are easily obtained by stamping or cutting.

The arrangement and the dimensioning of the retention lugs 44 and of the slots 48 thus allow the bayonet-type mounting enabling the assembly of the first and second portions 20 and 22 of the torsion damping device 12 to be produced without causing elastic deformation of the lugs and with a reduced assembly force.

More precisely, on its inner periphery the guide washer 28 has attachment lugs 128 directed towards the axis of the assembly and the piston 36 has longer circumferential openings opposite the lugs 128.

Thus the guide washer 28 can be riveted to the piston 24, three rivets 32 being provided per lug 128. Thanks thereto, an assembly comprising piston 24, washer 28, springs 30, disc 36 which is unitary, captive, easy to handle and transportable is produced.

Thus the springs 30 are advantageously placed on the fittings 34 of the guide washer 28, then the bosses 38 of the disc 36 are mounted between the circumferential ends of the springs 30, then the assembly comprising the guide washer 28, the springs 30 and the disc 36 is mounted in the piston 24 by engaging the lugs 44 in the slots 48, finally the guide washer 28 - disc 36 assembly is rotated to proceed with riveting at 32 of the washer 28 on the piston 24 thanks to the lugs 128 and to the corresponding openings 228.

Thus the lugs 44 can be hot-bent or cold-bent beforehand.

It is apparent from the evidence of the description and of the drawings that the openings 228 finally allow the attachment of the guide washer 28 and the formation of the above-mentioned sub-assembly.

Of course after assembly the circumferential distance between the lugs 44 and the slots 48 depends on the applications, especially the relative angular clearance between the disc 36 and the piston 24.

Thanks to the retention of the springs 30 by the piston 24, the bosses 38 of the disc 36 can be produced in advance and the guide washer 28 can be simplified.

As a reminder, it will be recalled that during operation the piston 24 may move axially under the effect of the difference in hydraulic pressure existing on either side of its faces. Thus the friction lining 60 may be clamped or not between the wall and the piston 24.

In the first case the locking clutch, comprising the piston 24 and the damping device 12, is locked with rotational connection between the housing 10 and the hub of the turbine wheel 18 in order to limit slippage.

Of course, the invention is not limited to the embodiment which has just been described.

The invention also includes all embodiments of the type enabling a bayonet-type axial connection to be provided, i.e. the systems achieving locking by a fraction of a turn.

Of course, the inner periphery of the guide washer 28 may be continuous and not divided into lugs 128. The washer 28 therefore has a zone for attachment at its inner periphery.

As a variant, the free end 46 of the skirt 26 of the piston 24 may have a constant thickness, the lugs 44 having the same thickness as the said skirt 26, depending on the applications.

As a variant, the guide washer 28 may externally retain the springs 30 as in document WO 94/07058, but this complicates production.

We claim:

1. A torsion damping device (12) for a locking clutch capable of acting between a housing (10) and a turbine wheel of a hydrokinetic coupling device, said torsion damping device comprising: two coaxial portions (20, 22), mounted movably in relation to one another in opposition to circumferentially acting springs (30), among which an input part (20) defined by a first portion having a piston (24) equipped with a guide washer (28) for bearing the springs (30), which is fixed thereto by riveting, and an output part defined by a second portion having an annular bearing disc (36) for the springs (30), and means for axially retaining the annular bearing disc (36) inside the first portion (20), thereby allowing a relative angular clearance between the first and second portions (20, 22), which comprise a series of lugs (44) of the first portion folded radially inwardly cooperatively with a section (42) of a cylindrical annular peripheral edge (40) of the disc (36) of the second portion (22), wherein the cylindrical annular peripheral edge (40) of the disc (36) comprises a series of slots (48) distributed angularly like the lugs (44) of the first portion and dimensioned so as to allow axial introduction of the lugs (44) into the slots (48) and axial retention of the second portion (22) inside the first portion (20) by relative rotation of the first and second portions by a fraction of a turn, in the manner of a bayonet-type mounting, and said lugs (44) are formed in a cylindrical annular skirt (26) which the piston (24) has on its outer periphery.

2. A torsion damping device according to claim 1, wherein the lugs (44) and the slots (48) are arranged in series of pairs of adjacent lugs (44) and slots (48).

3. A torsion damping device according to claim 2, wherein the piston (24) externally retains the springs (30), and the disc (36) internally retains the springs (30).

4. A torsion damping device according to claim 3, the guide washer (28) has a zone disposed on an inner periphery for attachment by riveting to the piston (24), and the disc (36) has openings (228) to allow attachment of the guide washer (28) to the piston (24) by riveting.

5. A torsion damping device according to claim 4, wherein the guide washer (28) has attachment lugs (128) disposed on an inner periphery thereof opposite the openings (228).

6. A torsion damping device according to claim 1, wherein the lugs (44) have a reduced thickness in relation to the annular skirt (26) of the piston (24).

7. A torsion damping device according to claim 1, wherein the cylindrical annular peripheral edge (40) of the disc (36) is slidingly received in the interior of the cylindrical annular skirt (26) of the piston (24).

* * * * *